Oct. 9, 1923.
H. A. RYTHER
CHUCK
Filed Feb. 18, 1922
1,470,197
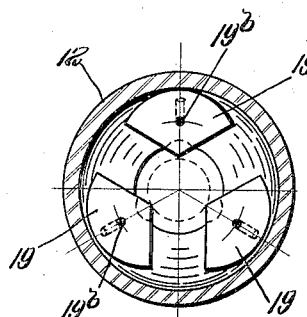
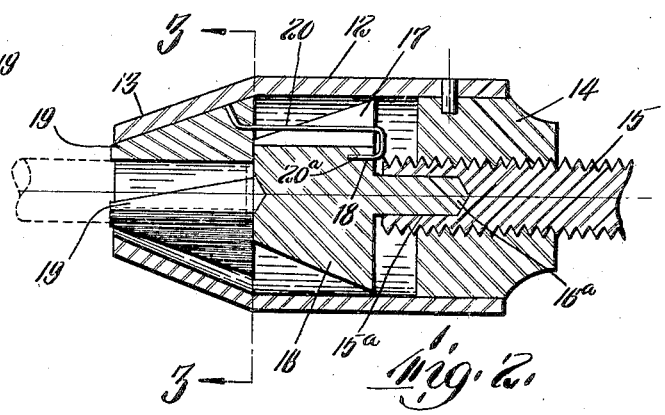
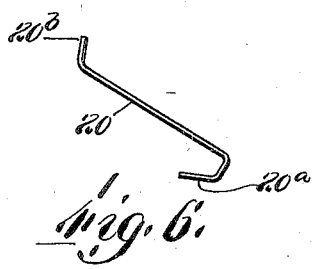
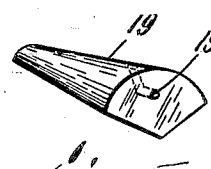
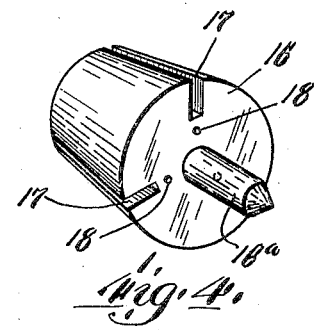
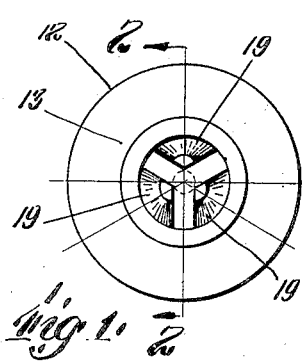
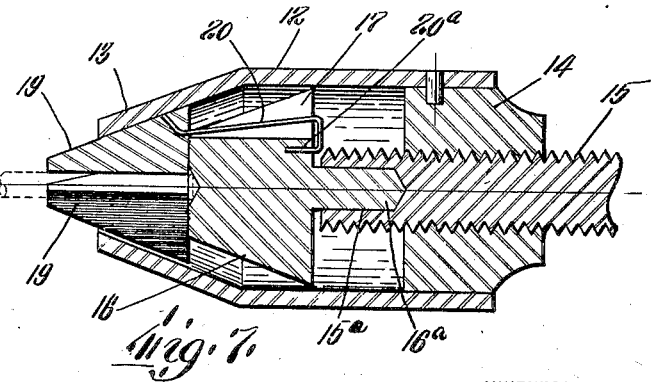
INVENTOR
Henry A. Ryther
BY
ATTORNEYS Patented Oct. 9, 1923.

1,470,197

UNITED STATES PATENT OFFICE.

HENRY A. RYTHER, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

CHUCK.

Application filed February 18, 1922. Serial No. 537,437.

*To all whom it may concern:*

Be it known that I, HENRY A. RYTHER, a citizen of the United States, residing at Montague, in the county of Franklin and State of Massachusetts, have invented new and useful Improvements in Chucks, of which the following is a specification.

This invention relates to a chuck which includes a tubular shell having a tapered end portion and a plurality of jaws, usually three, having tapered backs and parallel gripping edges, the jaws being pressed outwardly against the tapered portion of the shell by springs, and caused to open and close by longitudinal movements of the jaws relatively to the shell, effected by a threaded spindle engaged with the internally threaded bore of a head fixed to the shell, and a follower loosely connected with the spindle and interposed between the latter and the inner ends of the jaws.

The object of the invention is to provide a simple and effective construction involving a relatively small number of parts, adapted to be assembled and disconnected by a relatively small expenditure of time and labor.

The invention is embodied in the improvements which I will now proceed to describe and claim.

Of the accompanying drawings forming a part of this specification,—

Figure 1 is an end view of a chuck embodying the invention, the jaws being opened to the maximum extent.

Figure 2 is a longitudinal section on line 2—2 of Figure 1.

Figure 3 is a section on line 3—3 of Figure 2.

Figure 4 is a perspective view of the follower hereinafter described.

Figure 5 is a perspective view of one of the jaws.

Figure 6 is a perspective view of one of the springs.

Figure 7 is a view similar to Figure 2, showing the jaws partially closed.

The same reference characters indicate the same parts in all of the figures.

The tubular shell 12 of the chuck has a tapered end portion 13, and is provided at its opposite end with an annular head 14, fixed in any suitable way to the shell, the bore of the head having an internal screw thread. The head is fixed to the shell after the insertion in the latter of the jaws and the follower. The head is preferably forced into the shell and held therein by friction. 15 represents a spindle having an externally threaded portion, engaged with the thread of the head 14, the forward end of the spindle being enclosed in the shell. 16 represents a frusto-conical follower, which is movable in the shell by the spindle 15, and is provided with longitudinal radial slots 17, and with longitudinal sockets 18, adjacent to the bottoms of said slots, as indicated by Figure 4, said sockets opening on the inner end face of the follower. The outer end of the follower is flat and at right angles with the axis of the follower, and constitutes a guide on which the jaws hereinafter described are radially movable. The follower is loosely and separably connected with the spindle 15, so that rotation of the latter does not rotate the follower, and the spindle is adapted to be operatively engaged with the follower, after the insertion of the latter in the shell, the preferred connection being provided by a bearing 15ª bored in the enclosed end of the spindle and coaxial therewith, and a stud 16ª, formed on and projecting from the inner end of the follower and journaled in the bearing.

The chuck jaws 19 have inclined backs conforming to the taper of the shell portion 13, and are provided with parallel gripping edges. The inner ends of the jaws are flat and conform to the guiding end face of the follower, so that the jaws are radially movable on said end face.

The jaws are pressed yieldingly outward against the internal surface of the shell, by elongated wire springs 20. Said springs are anchored in the inner end of the follower, they extend lengthwise of the chuck between the sides of the follower slots 17, and have free outer ends projecting forward from the jaw-guiding end face of the follower, and into the inner ends of the jaws, to confine said ends against the follower. The width of the slots 17 relative to the diameter or gage of the wire of which the springs are made, is such that the radial sides of the slots loosely support and guide the springs, so that the springs are movable only in radial directions. The springs are under tension, tending to swing their free ends outward, so that they exert radial outward pressure on the jaws. This pressure maintains the jaws with their backs in contact with the tapered shell portion 13 and their gripping edges parallel with each other and equi-distant from the axis of the chuck.

The confined rear ends of the springs are formed by reversely bent shanks 20ª removably inserted in the sockets 18 of the follower, the arrangement of the shanks and sockets being such that the springs cannot be independently moved forward lengthwise.

The free forward ends of the springs are formed by inclined portions constituting oblique hooks 20ᵇ, inserted in oblique sockets 19ᵇ in the inner ends of the jaws, the arrangement being such that the said hooks and sockets confine the inner ends of the jaws against the guiding end face of the follower, and prevent independent backward endwise movement of the springs.

In assembling the parts the jaws are first connected with the follower by the springs, the engagement of the shanks 20ª with the jaw sockets 18 preventing independent forward endwise movement of the springs, and the engagement of the oblique hooks 20ᵇ, with the jaws sockets 19ᵇ, preventing independent backward endwise movement of the springs, so that the inner ends of the jaws are confined by the springs against the jaw-guiding end face of the follower. The jaws and the follower are inserted in the shell, in the position shown by Figure 2, the jaws being fully open, and the follower stud 16ª being at the axial center of the shell. The head 14 is then inserted and secured, its threaded bore being in axial alinement with the stud 16ª. The spindle is then inserted in the bore and moved forward until its socket 15ª receives the stud 16ª, so that the follower has a positive bearing on the spindle. Subsequent forward movement of the spindle causes it to force the follower and the jaws forward, and cause the closing of the jaws against the pressure of the springs, as indicated by Figure 7. When the spindle is moved backward to open the jaws, the springs, holding the inner ends of the jaws against the guiding end face of the follower as described, cooperate with the tapered portion 13 of the shell, in causing the jaws to open, and the follower to move backward with the spindle, the inclined backs of the jaws sliding on the tapered portion, so that the jaws move backward in the shell and press the follower backward against the spindle. The follower moves backward with the spindle until the jaws are fully opened. After this, the backward movement of the spindle may be continued to cause its separation from the follower, so that the parts may be conveniently separated, the head 14 being first removed from the shell, and the follower and jaws subsequently removed.

I claim:

A chuck comprising, in combination, a shell having a tapered end portion and a fixed internally threaded head, a threaded spindle engaged with the head to enter the shell, a follower movable in the shell, and having a loose separable connection with the spindle, so that a forward movement of the spindle forces the follower toward the said tapered portion, the follower being provided with radial longitudinal slots in its periphery, and with a jaw-guiding face at its forward end, at right angles with the axis of the chuck, jaws having inclined backs conforming to the said tapered portion, and inner end faces conforming to said guiding face, and elongated wire springs of greater length than the follower, extending through and guided radially by said slots, said springs having reversely bent shanks anchored in the rear end of the follower, to prevent independent forward endwise movement of the springs, and obliquely and outwardly extending free ends inserted in outwardly extending oblique sockets in the rear ends of the jaws to fixedly interlock the springs with the jaws and to confine the latter against the follower, the tension of the springs pressing their free ends outward in radial paths determined by said slots, the arrangement being such that when the spindle is moved forward, it presses the follower and jaws forward, and closes the jaws against the pressure of the springs, and when the spindle is moved backward, the springs cooperate with the tapered end portion of the shell to open the jaws and press the follower against the spindle, so that the jaws and the follower move backward with the spindle, the said loose separable connection permitting the separation of the spindle from the follower when the jaws are fully opened.

In testimony whereof I have affixed my signature.

HENRY A. RYTHER.